United States Patent
Huang

(10) Patent No.: US 7,426,251 B1
(45) Date of Patent: Sep. 16, 2008

(54) HIGH SPEED TRANSCEIVER OPERABLE TO RECEIVE LOWER DATA RATE TRANSMISSIONS

(75) Inventor: Dai Huang, Cupertino, CA (US)

(73) Assignee: XILINX, Inc., San Jose, CA (US)

( * ) Notice: Subject to any disclaimer, the term of this patent is extended or adjusted under 35 U.S.C. 154(b) by 1010 days.

(21) Appl. No.: 10/771,210

(22) Filed: Feb. 3, 2004

(51) Int. Cl.
*H04L 7/00* (2006.01)
*H04B 1/38* (2006.01)

(52) U.S. Cl. ...................... 375/355; 375/219

(58) Field of Classification Search ............... 375/219, 375/354, 355
See application file for complete search history.

(56) References Cited

U.S. PATENT DOCUMENTS

| | | | |
|---|---|---|---|
| 4,280,224 A | | 7/1981 | Chethik |
| 4,933,959 A | | 6/1990 | Knechtel |
| 6,128,680 A | | 10/2000 | Sallee |
| 6,711,221 B1 | * | 3/2004 | Belotserkovsky et al. ... 375/355 |
| 7,089,444 B1 | * | 8/2006 | Asaduzzaman et al. ..... 713/600 |
| 7,167,534 B2 | * | 1/2007 | Nakamura ................... 375/373 |
| 7,197,098 B2 | | 3/2007 | Johnson |
| 7,257,183 B2 | | 8/2007 | Dally et al. |
| 2003/0190006 A1 | | 10/2003 | Nagano |
| 2006/0062327 A1 | | 3/2006 | Dally |

OTHER PUBLICATIONS

Razavi, Behzad, Monolithic Phase-Locked Loops and Clock Recovery Circuits, Theory and Design, IEEE Press, 1996, Part 5. AT&T Bell Laboratories, 11 pages, ISBN 0-7803-1149-3.

UG024, "RocketIO Transceiver User Guide", Feb. 22, 2007, Xilinx, Inc. 2100 Logic Drive, San Jose, CA 95124.
XAPP224 (v2.3), Application Note, Sawyer, Nick, Data Recovery, Mar. 4, 2004, pp. 1-7, available from Xilinx, Inc., 2100 Logic Drive, San Jose, CA 95124.
U.S. Appl. No. 10/930,579, filed Aug. 31, 2004, Chuang, Jerry, et al., entitled, "High Speed Transceiver Receiving Lower Rate Data", Xilinx, Inc., 2100 Logic Drive, CA 95124.

(Continued)

*Primary Examiner*—David B Lugo
(74) *Attorney, Agent, or Firm*—Timothy W. Markison; Justin Liu

(57) ABSTRACT

A high speed transceiver operable to receive lower data rate transmissions includes an oversampling module and a data recovery system. The oversampling module is operably coupled to oversample a unique alignment sequence and data of a data stream received at a first data transmission to produce an oversampled unique alignment sequence and oversampled data, respectively, wherein the first data transmission rate is less than a serial bit rate of the high speed transceiver. The data recovery system is operably coupled to: compare a portion of the oversampled unique alignment sequence with an expected oversampled partial alignment sequence; when the comparing the portion of the oversampled unique alignment sequence with the expected oversampled partial alignment sequence is favorable, determine one of a plurality of word alignments for the data stream based on the portion of the oversampled unique alignment sequence; and recover aligned data at the first data transmission rate from the oversampled data based on the one of the plurality of word alignments.

37 Claims, 10 Drawing Sheets

OTHER PUBLICATIONS

U.S. Appl. No. 11/035,613, filed Jan. 14, 2005, Bataineh, Khaldoun, et al., entitled, "Receiver Operable to Receive Data at a Lower Data Rate", Xilinx, Inc., 21000 Logic Drive, CA 95124.

Razavi, Behzad, Monolithic Phase-Locked Loops and Clock Recovery Circuits, Theory and Design, IEEE Press, 1996, Part 5. AT&T Bell Laboratories, 11 pages, ISBN 0-7803-1149-3.

UG024, "RocketIO Transceiver User Guide", Feb. 22, 2007, Xilinx, Inc. 2100 Logic Drive, San Jose, CA 95124.

XAPP224 (v2.3), Application Note, Sawyer, Nick, Data Recovery, Mar. 4, 2004, pp. 1-7, available from Xilinx, Inc., 2100 Logic Drive, San Jose, CA 95124.

* cited by examiner programmable logic device 10

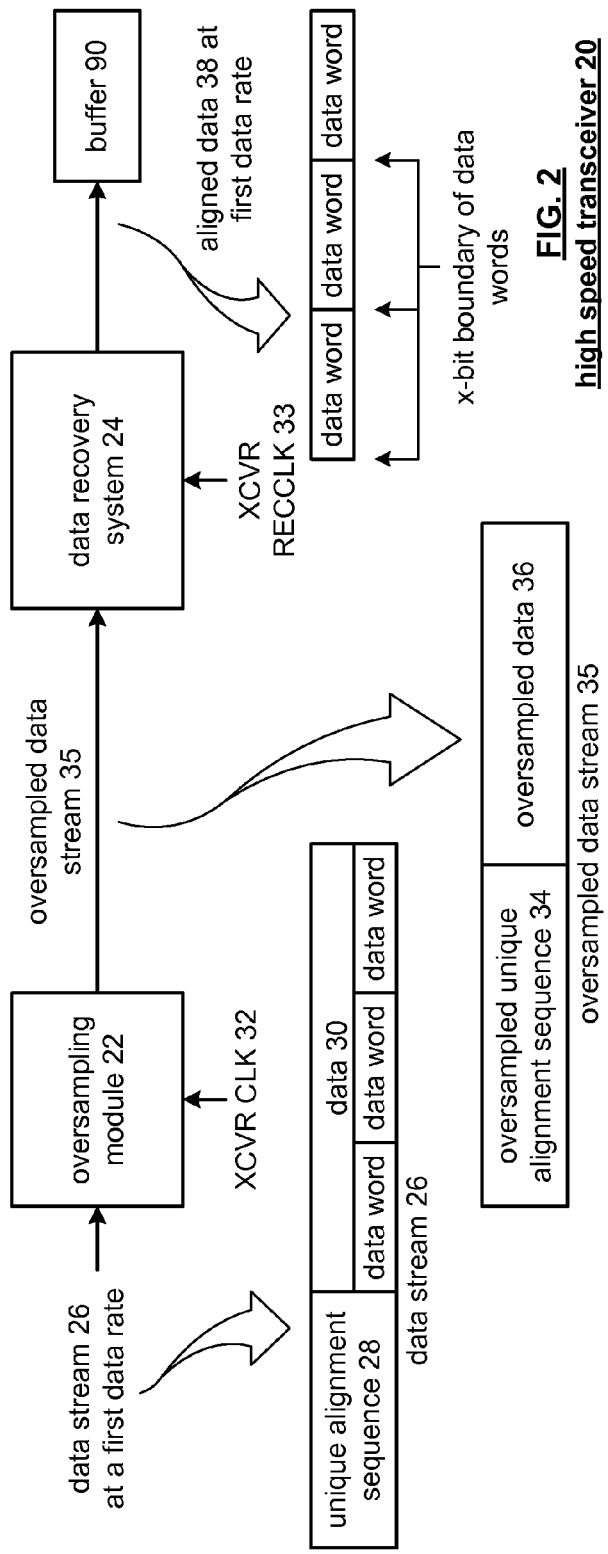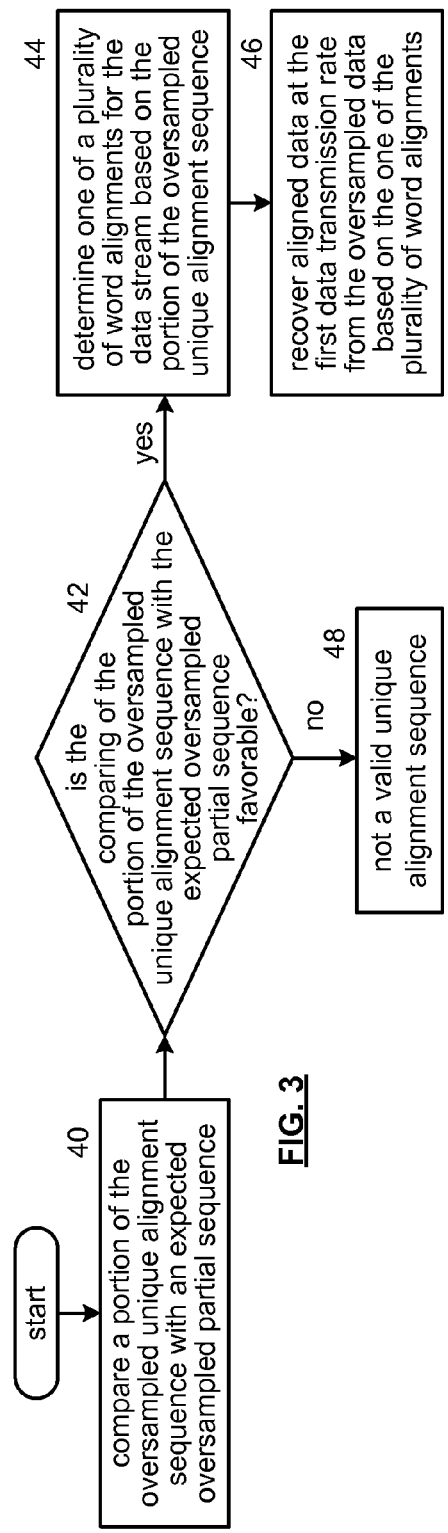

data recovery system 24
(alignment detection function)

concatenation module 52, comparison module 54, and state machine 56

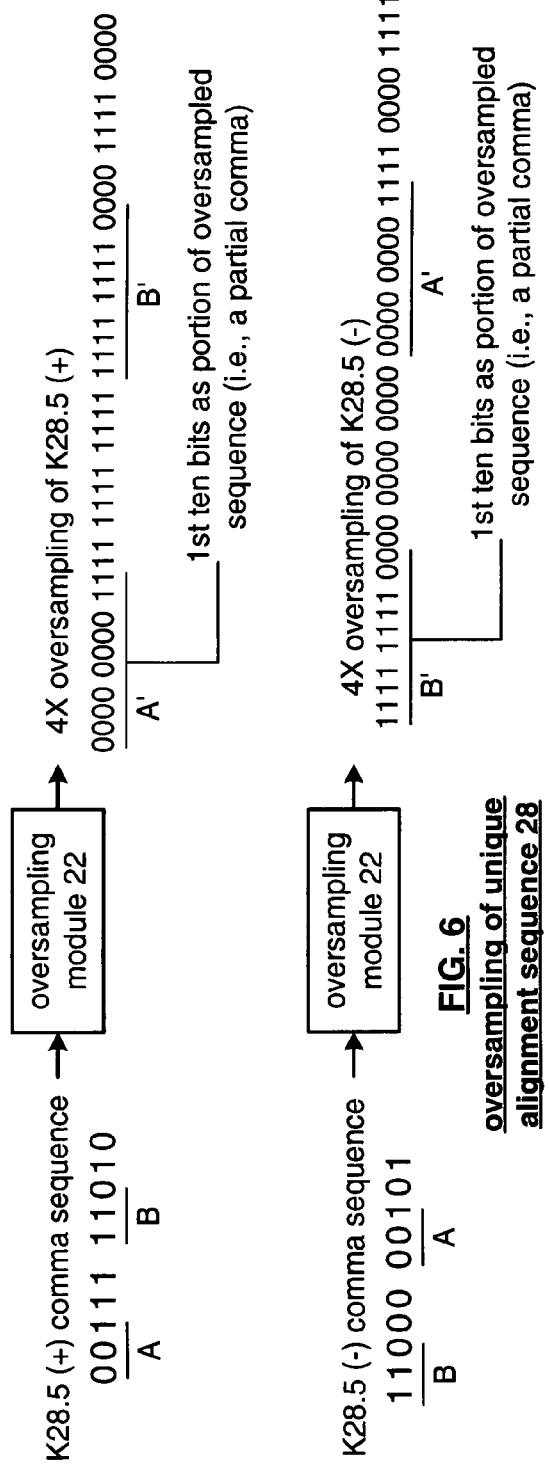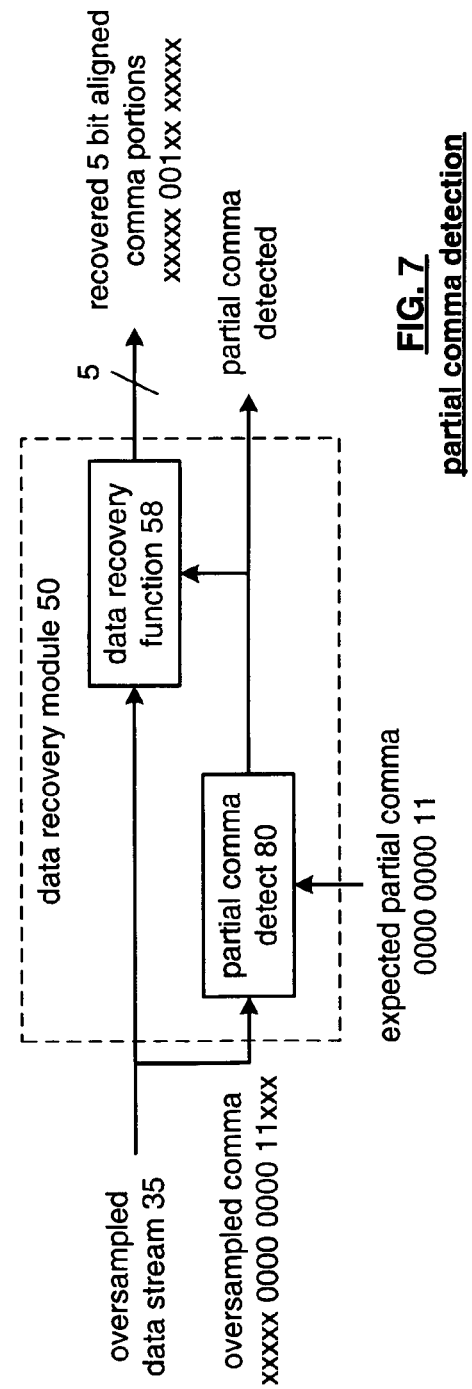
FIG. 6
oversampling of unique alignment sequence 28
FIG. 7
partial comma detection data alignment data recovery system 24 data recovery system 24

HIGH SPEED TRANSCEIVER OPERABLE TO RECEIVE LOWER DATA RATE TRANSMISSIONS

TECHNICAL FIELD OF THE INVENTION

This invention relates generally to integrated circuits and more particularly to high speed transceivers.

DESCRIPTION OF RELATED ART

As is known, a transceiver includes a serializer and a deserializer (SERDES) that perform serial-to-parallel data conversions and parallel-to-serial data conversions between high-speed serial interfaces and parallel data interfaces in a full duplex manner. In general, the serializer converts parallel data from a parallel data interface into a serial data stream that is provided to a high-speed serial data interface. Conversely, the deserializer converts serial data from a high-speed serial data interface into parallel data that is provided to a parallel data interface. The serial data processed by the serializer and the deserializer may be scrambled data streams or encoded data streams.

One technique for producing an encoded data stream is 8B/10B coding. As is known, 8B/10B encoding involves converting 8 bits of data into a 10 bit character and 8B/10B decoding involves recovering the 8 bits of data from a 10 bit character. As is further known, 8B/10B coding provides sufficient signal transitions and a DC balance in the data stream, both of which are necessary for proper operation of a phase locked loop (PLL). With such a coding scheme, the 10 bit characters offer four times the number of characters of the 8-bits of data such that special 10 bit characters may be defined for link level controls such as a synchronous character (which is sometimes referred to as a comma character) and framing characters. As is known, transceivers use comma characters to identify transmission-character boundaries so that word boundaries in a serial data stream are properly recovered at the parallel data interface. As such, transceivers that employ 8B/10B coding including a comma detection and alignment circuit to detect the comma character and to align the 10 bit characters.

As is also known, transceivers may be embedded in a programmable logic device and operate over a serial bit rate range (e.g., 600 Mega bits per second (Mbps) to 3.125 Giga bits per second (Gbps)). However, some input/output (I/O) serial interfaces require data transmission rates well below the clock data recovery range of the phase locked loop of the transceiver. For example, Enterprise System CONnection (ESCON) and Single-Bit Command Code Sets CONnection (SBCON) each have data rates as low as 200 Mbps, Fiber Channel has data rate requirements of 133 Mbps, 266 Mbps, and 531 Mbps, and DVB-ASI has a data rate requirement of 270 Mbps.

To enable a transceiver to receive lower data rates than its serial bit rate range, the transceiver may use an oversampling technique, such that each serial bit is replicated multiple times. With each bit of the data stream replicated multiple times, each bit of the comma character is also replicated multiple times, which requires a special comma detection circuit for oversampled lower speed data streams. As such, each transceiver has two comma detect circuits: one for normal use, i.e., data rates within the designed serial bit rate range, and one for lower speed data streams. Further, the transceiver also includes two alignment circuits: one for normal data rates and the other for the lower speed data streams. Typically, the extra comma detection circuit and alignment circuit are implemented external to the transceiver module, which adds to the complexity and cost of using such programmable logic devices.

Further, by implementing the comma detection and alignment external to the transceiver for lower data rates, the receiving elastic storage and clock correction of the transceiver are unusable since they are designed for normal operation. As is known, the clock/data recovery circuit of the transceiver extracts clock phase and frequency from the incoming data stream, hereafter referred to as recovered clock, which reflects the data rate of the incoming data. As is known, transceivers also have user clock at the parallel interface that defines the rate which the user logic consumes the data. The recovered clock and the user clock typically have different sources, and one of the clocks may be faster than the other. As is known, the elastic storage and clock correction of the transceiver compensate for slight differences in the clock rates of the recovered clock and the user clock of transceivers. As is known, clock correction logic coupled to the elastic storage requires the comma alignment achieved beforehand so that the clock correction sequence can be recognized and manipulated. If the comma detection and alignment circuit is implemented external to the transceiver, the clock correction and elastic storage circuit must be implemented external to the transceiver. As such, if clock correction is desired for lower data rates, an external elastic storage device and clock correction circuitry need to be employed, which further adds to the complexity and cost of using such programmable logic devices.

As is known, the recovered clock needs to drive comma detection, comma alignment, clock correction and elastic storage circuits. If the clock correction and elastic storage circuit are implemented externally, the recovered clock must be brought out to the external components, which further complicates the clocking scheme in the system and adds to the complexity and cost of using such programmable logic devices.

Therefore, a need exists for a high speed transceiver that is operable to receive lower rate data streams with minimal external components, thereby reducing the complexity and associated costs of using programmable logic devices.

BRIEF SUMMARY OF THE INVENTION

The high speed transceiver operable to receive lower data rate transmissions of the present invention substantially meets these need and others. In one embodiment, a method for using a high speed transceiver to receive lower data rate transmissions begins by receiving a data stream at a first data transmission rate, wherein the data stream includes a unique alignment sequence and data, and wherein the first data transmission rate is less than a serial bit rate of the high speed transceiver. The processing continues by oversampling the unique alignment sequence and the data to produce an oversampled unique alignment sequence and oversampled data, respectively. The processing continues by comparing a portion of the oversampled unique alignment sequence with an expected oversampled partial alignment sequence. The processing continues by, when the comparing the portion of the oversampled unique alignment sequence with the expected oversampled partial alignment sequence is favorable, determining one of a plurality of word alignments for the data stream based on the portion of the oversampled unique alignment sequence. The processing continues by recovering aligned data at the first data transmission rate from the oversampled data based on the one of the plurality of word alignments. As such, an embodiment of a high speed transceiver that is operable to receive lower rate data streams with minimal external components and drawbacks associated therewith is achieved.

In another embodiment, a high speed transceiver operable to receive lower data rate transmissions includes an oversampling module and a data recovery system. The oversampling module is operably coupled to oversample a unique alignment sequence and data of a data stream received at a first data transmission to produce an oversampled unique alignment sequence and oversampled data, respectively, wherein the first data transmission rate is less than a serial bit rate of the high speed transceiver. The data recovery system is operably coupled to: compare a portion of the oversampled unique alignment sequence with an expected oversampled partial alignment sequence; when the comparing the portion of the oversampled unique alignment sequence with the expected oversampled partial alignment sequence is favorable, determine one of a plurality of word alignments for the data stream based on the portion of the oversampled unique alignment sequence; and recover aligned data at the first data transmission rate from the oversampled data based on the one of the plurality of word alignments.

BRIEF DESCRIPTION OF THE DRAWINGS

FIG. 2 is a schematic block diagram of a high-speed transceiver in accordance with the present invention;

FIG. 3 is a logic diagram of a method performed by a data recovery system in accordance with the present invention;

FIG. 6 is a schematic block diagram of an example of oversampling a unique alignment sequence in accordance with the present invention;

FIG. 7 is a schematic block diagram of an example of partial comma recovery in accordance with the present invention;

DETAILED DESCRIPTION OF THE INVENTION

Figure 1:
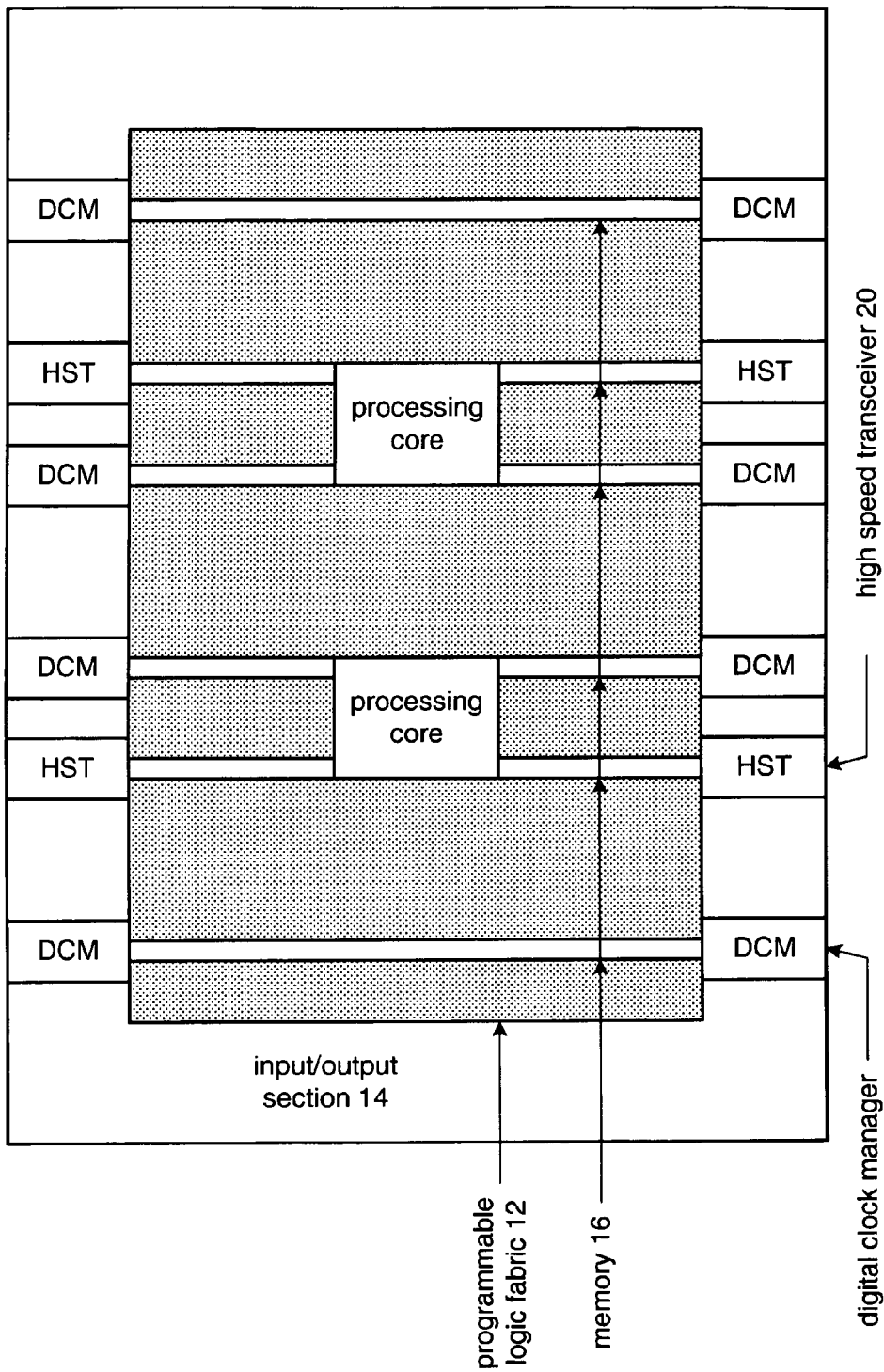
FIG. 1 is a schematic block diagram of a programmable logic device in accordance with the present invention.

FIG. 1 is a schematic block diagram of a programmable logic device 10 that includes a programmable logic fabric 12, an input/output section 14 and memory 16. The programmable logic fabric 12 may include one or more processing cores and programmable logic circuitry that may be implemented as programmable logic arrays (PLA), programmable array logic (PAL) devices, erasable programmable logic devices (EPLD), and/or programmable gate arrays (PGA). The input/output section 14 includes one or more digital clock managers (DCM) and one or more high-speed transceivers (HST) 20, which may be multi-gigabit transceivers operable to provide serial-to-parallel and parallel-to-serial conversions for data inputted to and outputted from the programmable logic device 10.

FIG. 2 is a schematic block diagram of a high-speed transceiver 20 that is operable to receive lower data rate transmissions than its corresponding serial bit rate. The high-speed transceiver 20 includes an oversampling module 22, a data recovery system 24 and a buffer 90. The oversampling module 22 is operably coupled to receive a data stream 26 at a $1^{st}$ data rate. The $1^{st}$ data rate is less than the transceiver serial bit rate. The serial bit rate of the transceiver is implied by the transceiver clock (XCVR CLK) 32. For example, the transceiver clock 32 may be set within a range of 30 MHz to 156.25 MHz to support any serial bit rate in the range of 600 to 3125 Mbps, and the $1^{st}$ data rate may correspond to 133 Mbps, 266 Mbps, 531 Mbps, 270 Mbps, or 200 Mbps. The particular oversampling rate used by the oversampling module 22 is dependent on the ratio between the serial bit rate of the transceiver and the $1^{st}$ data rate of the data stream 26. For example, the oversampling rate may be 4, 8, 10, et cetera. Based on the oversampling rate, the oversampling module 22 produces an oversampled data stream 35 from data stream 26. The oversampling module 22 also extracts clock phase and frequency from the incoming data stream, hereafter referred to as the recovered clock (XCVR RECCLK) 33, which reflects the data rate of the oversampled data stream.

As is further shown in FIG. 2, the data stream 26 includes a unique alignment sequence 28 and a data section 30 that includes a plurality of data words. The unique alignment sequence 28 is used by the transceiver to align data recovery with the boundaries of the data words within the data segment 30. For instance, the data stream 26 may include an 8B/10B encoded comma-character as the unique alignment sequence 28 and the data may include 8B/10B encoded data.

FIG. 2 further shows that the oversampled data stream 35 includes an oversampled unique alignment sequence 34 and oversampled data 36. For example, if the oversampling rate is 4, each bit of the unique alignment sequence 28 will be replicated 4 times in the oversampled unique alignment sequence 34. Similarly, each bit of the data segment 30 will be replicated 4 times in the oversampled data section 36.

The data recovery system 24 receives the oversampled data stream 35 and, based on the recovered clock 33, identifies the boundaries of the data words, which will be described in greater detail with reference to FIG. 3, to produce the aligned data 38 at the $1^{st}$ data rate. The aligned data 38 corresponds to the data words, which may be stored in buffer 90 and subsequently retrieved therefrom.

FIG. 3 is a logic diagram of a method used by the data recovery system 24 to produce the aligned data. The processing begins at Step 40 where the data recovery system compares a portion of the oversampled unique alignment sequence with an expected oversampled partial sequence. By looking for only a portion of the oversampled unique alignment sequence, the existing alignment sequence detection circuit (e.g., comma detect circuit) of the transceiver may be utilized such that external alignment sequence detection circuit is no longer required.

The processing then proceeds to Step 42 where the data recovery system determines whether the comparing of the portion of the oversampled unique alignment sequence with the expected oversampled partial sequence is favorable. If not, the process proceeds to Step 48 where the data recovery system 24 determines that the currently sensed oversampled data stream 35 does not include a valid unique alignment sequence and repeats at step 40 for subsequent data streams.

If, however, the comparison at Step 42 was favorable, the process proceeds to Step 44 where the data recovery system 24 determines one of a plurality of word alignments for the data stream based on the portion of the oversampled unique alignment sequence. This will be further described in greater detail with reference to FIGS. 4-8, but in general refers to determining the boundaries of the data words. The process then proceeds to Step 46 where the data recovery system 24 recovers aligned data at the $1^{st}$ data transmission rate from the oversampled data based on the one of the plurality of word alignments.

Figure 4:
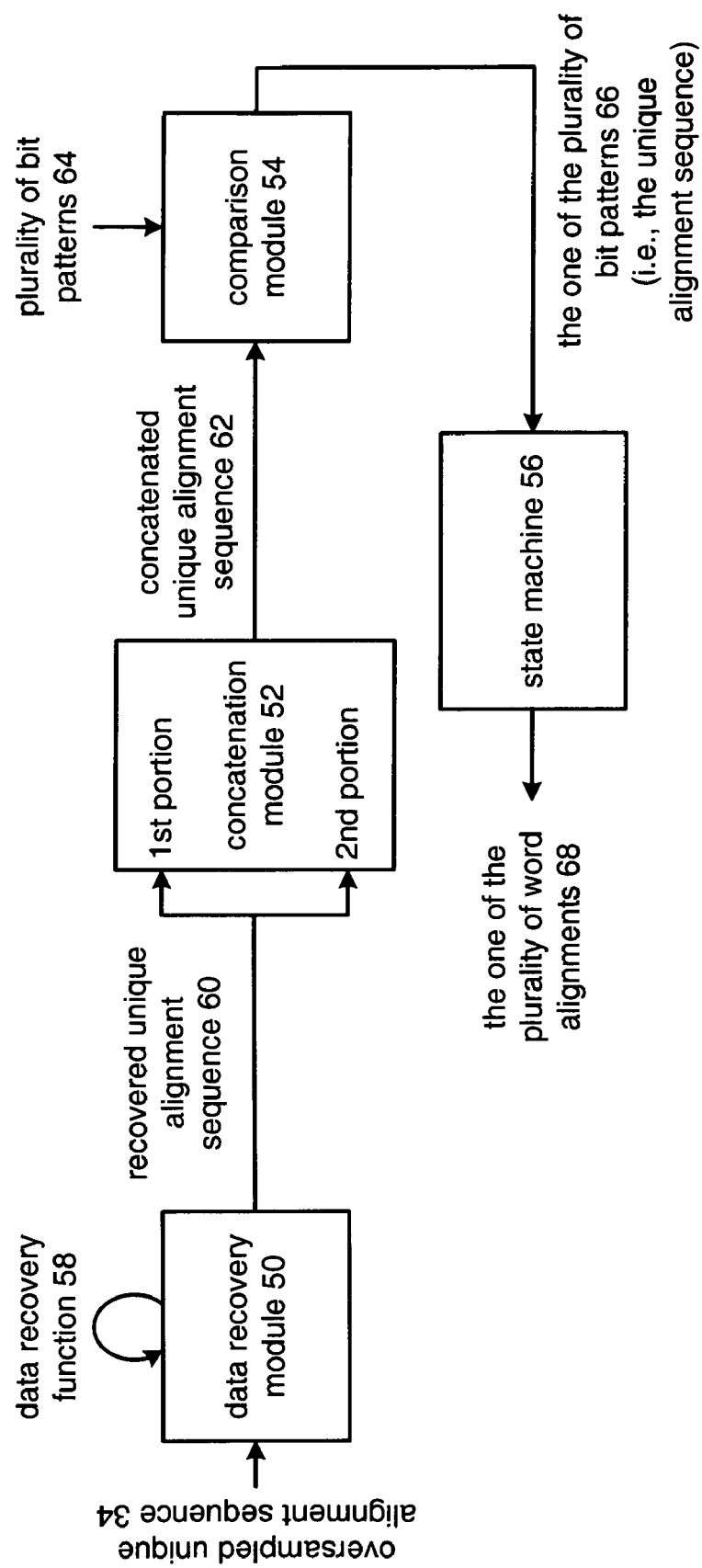
FIG. 4 is a schematic block diagram of a data recovery system in accordance with the present invention.

FIG. 4 is a schematic block diagram of an embodiment of the data recovery system 24 performing the alignment detection function. In this embodiment, the data recovery system 24 includes a data recovery module 50, a concatenation module 52, a comparison module 54 and a state machine 56. The data recovery module 50 performs a data recovery function 58 (e.g., the inverse of oversampling) upon the oversampled unique alignment sequence 34 (and the oversampled data 36) to produce a recovered unique alignment sequence 60 (and recovered data). Note that the unique alignment sequence, and thus the oversampled unique alignment sequence 34, corresponds to one of a plurality of bit patterns wherein each of the plurality of bit patterns includes a same bit pattern portion at different bit locations than other bit patterns. The same bit pattern portion corresponds to the portion of the oversampled unique alignment sequence. For example, if one unique alignment sequence is 00111 11010 and another is 11000 00101, then they both have a same bit pattern portion of 001, but in different bit locations. This will be more fully described with reference to the example of FIGS. 6-8. Note that the data recovery module 50 produces a portion of recovered unique alignment sequence 60 at each clock cycle of the recovered clock (XCVR RECCLK) 33, since the oversampled unique alignment sequence 34 only contains a portion of the unique alignment sequence at each clock cycle of XCVR RECCLK.

The concatenation module 52 receives a $1^{st}$ portion and a $2^{nd}$ portion, or more portions, of the recovered unique alignment sequence 60 and produces a concatenated unique alignment sequence 62. For example, if the recovered unique alignment sequence 60, or a portion thereof, is 5-bits per cycling interval, the $1^{st}$ portion corresponds to a 5-bit segment received at time $T_0$ and the $2^{nd}$ portion corresponds to a 5-bit segment received at time $T_1$ of the interval cycle. The resulting concatenated unique alignment sequence 62 places the $2^{nd}$ portion subsequent to the $1^{st}$ portion to produce, for example, a 10-bit data word.

The comparison module 54 compares the concatenated unique alignment sequence 62 with a plurality of bit patterns 64 (e.g., a plurality of known expected alignment sequences). Note that the recovered unique alignment sequence 60 is no longer at the oversampled rate but at the $1^{st}$ data rate. When the comparison is favorable, the comparison module 54 provides the identified one of the plurality of bit patterns 66, i.e., the identified unique alignment sequence, to the state machine 56. The state machine 56 interprets the unique alignment sequence to determine one of a plurality of word pattern alignments 68. This will be described in greater detail with reference to the example of FIGS. 6-8.

Figure 5:
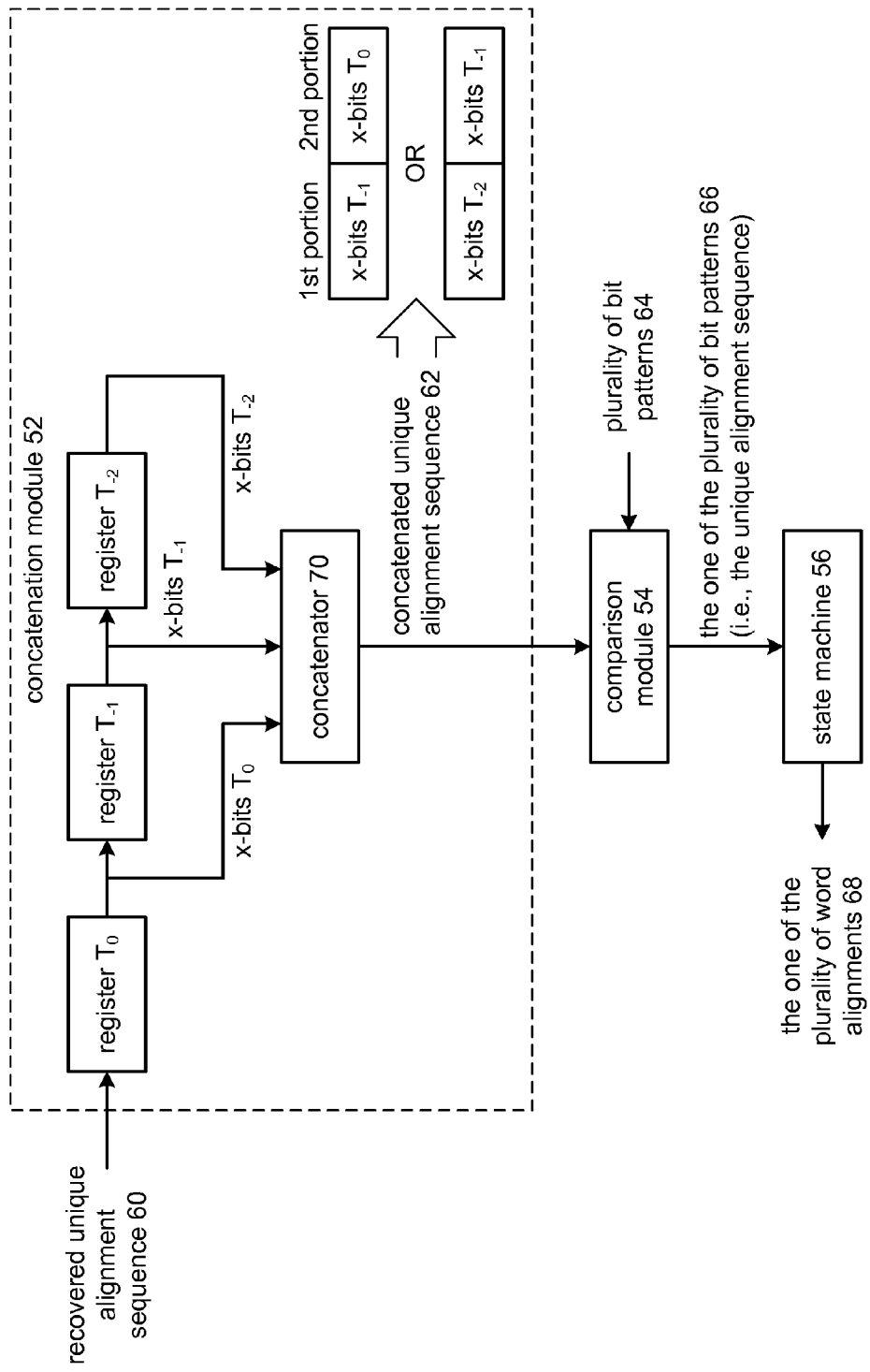
FIG. 5 is a schematic block diagram of a concatenation module, comparison module, and state machine in accordance with the present invention.

FIG. 5 is a schematic block diagram that illustrates an embodiment of the concatenation module 52 in greater detail and its coupling to the comparison module 54 and the state machine 56. This embodiment assumes the data recovery module 50 produces two portions of recovered unique alignment sequence for each oversampled unique alignment sequence, but as one of average skill in the art will appreciate more than two portions of the recovered unique alignment sequence may be used. The concatenation module 52 includes a plurality of time ordered registers (register $T_0$, $T_{-1}$, and register $T_{-2}$). Each of these registers receives, in time, X bits of a portion of the recovered unique alignment sequence 60. As such, at any given moment, register $T_{-2}$ stores X bits $T_{-2}$ of the unique alignment sequence 60, register $T_{-1}$ stores X bits $T_{-1}$ of the unique alignment sequence 60 and register $T_0$ stores X bits $T_0$ of the unique alignment sequence 60. The concatenator 70 concatenates two of the three register outputs to produce the concatenated unique alignment sequence 62. In one concatenation embodiment, the concatenator 70 selects the $1^{st}$ portion of the concatenated unique alignment sequence 60 to be the X bits from register $T_{-1}$ and the $2^{nd}$ portion of the concatenated unique alignment sequence 60 to be the X bits from register $T_0$. Alternatively, the $1^{st}$ portion may include the X bits from register $T_{-2}$ and the $2^{nd}$ portion may include the X bits from register $T_{-1}$. Note that X corresponds to a variable number of bits that may from a few bits to tens of bits.

The comparison module 54 compares the concatenated unique alignment sequence 62 with a plurality of bit patterns 64 to produce a one of the plurality of bit patterns 66. The state machine receives the one of the plurality of bit patterns 66 to identify the one of the plurality of word alignments 68. Accordingly, the one of the plurality of word alignments 68 corresponds to how the unique alignment sequence 62 is concatenated. For example, one word alignment is achieved when the $1^{st}$ portion is received from register $T_{-1}$ and the $2^{nd}$ portion from register $T_0$ and another word alignment is achieved when the $1^{st}$ portion is from register $T_{-2}$ and the $2^{nd}$ portion is from register $T_{-1}$.

Figure 8:
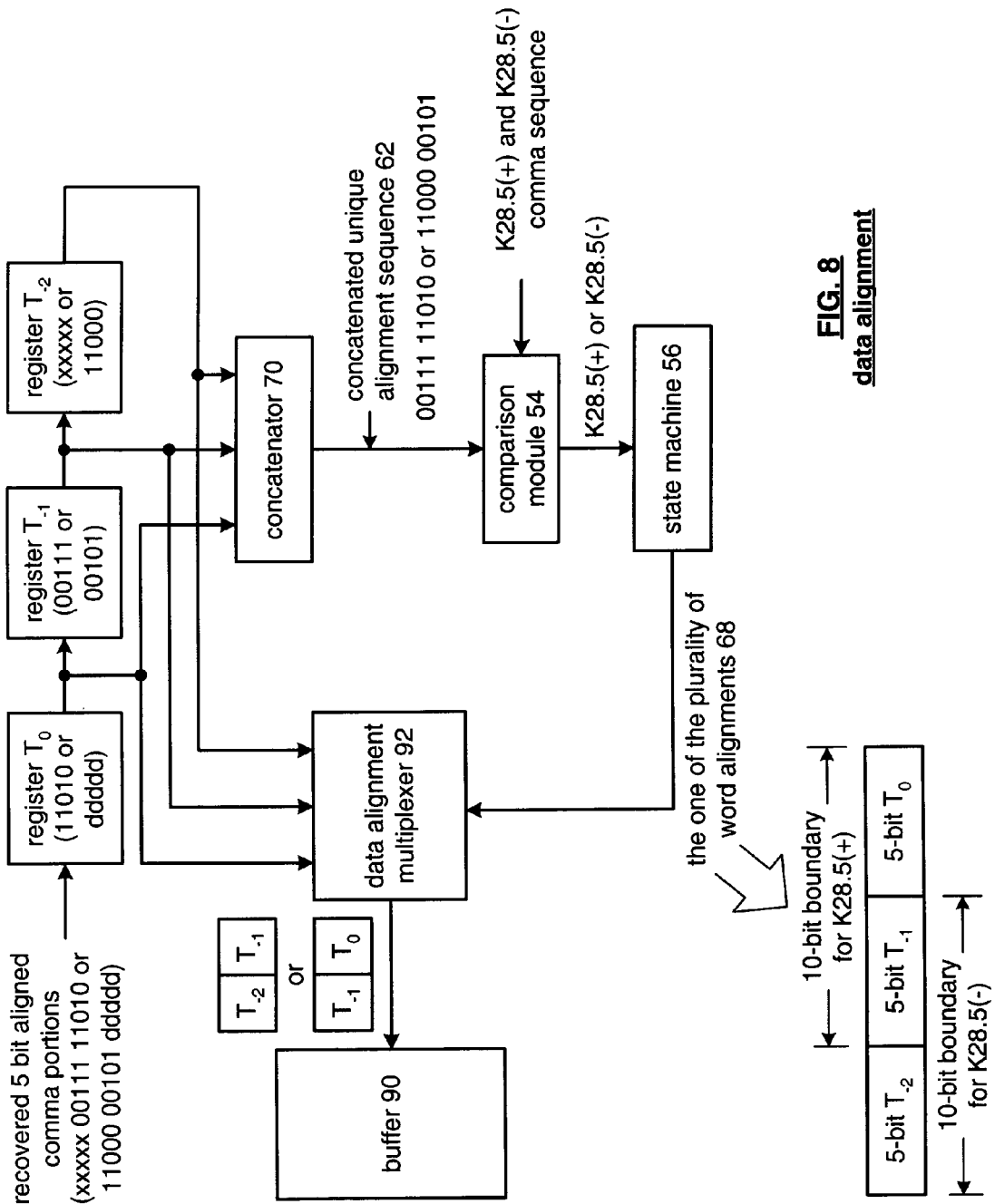
FIG. 8 is a schematic block diagram of an example of data alignment in accordance with the present invention.

FIGS. 6-8 illustrate an example of the operation of transceiver 20 of FIG. 2 where the unique alignment sequence is one of a K28.5(+) comma sequence or a K28.5(−) comma sequence and the data words corresponds to 8B/10B coding characters. Note that the complimentary (e.g., positive and negative disparity) comma sequences are used to maintain a DC balance on the transmitted serial data stream. As such, one comma sequence or the other may be received without indication as to which one is being received or which one will subsequently be received. As such, the transceiver must be equally adept at identifying either the positive comma sequence or the negative comma sequence. As is further shown, each comma sequence has two similar bit portions. Similar bit portion A includes the binary value of 001 and similar bit portion B includes binary value of 110.

When the oversampling module 22 oversamples the positive comma sequence, and the sampling rate is 4 times, a 4× oversampling comma sequence is achieved. The $1^{st}$ 10 bits of the oversampled positive comma sequence (i.e., a partial comma) correspond to the same bit pattern portion 001 of the positive comma sequence. As such, the normal comma detect circuitry within the transceiver may be utilized for the partial comma detection process. Similarly, when the oversampling module 22 oversamples the negative comma sequence at the 4× oversampling rate, a 4× oversampled negative sequence is obtained wherein the $1^{st}$ 10 bits are used as the partial comma and correspond to the same bit pattern portion 110 of the negative comma sequence.

FIG. 7 illustrates the partial comma detection as performed by the data recovery module 50. As shown, the data recovery module 50 includes a partial comma detect 80 and a data recovery functional module 58. The partial comma detect module 80 is the existing 10-bit comma detect circuit in transceivers that utilize 8B/10B encoding at data rates within the normal serial bit rate of the transceiver. In this example, the oversampled data stream 35 is provided to both the partial comma detect 80 and the data recovery function 58. The oversampled comma includes, for this example, 5 unknown bits (represented by XXXXX) and 10-bits of a partial comma (that include 0000 0000 11) and two more unknown bits.

In this instance, the partial comma detect circuit 80 compares the oversampled comma with the expected partial comma of 0000 0000 11. When the oversampled comma is aligned with the expected partial comma, the partial comma detect circuit 80 indicates that a partial comma has been detected. This establishes 5-bit alignment for the oversampled data stream 35. In other words, at this point it is unknown whether the oversampled comma portion corresponds to a negative comma sequence or a positive comma sequence but it is known that one of the two comma sequences is present. The 5-bit alignment is known, in that, due to the location of the 001 within the negative and positive comma sequences, it is either the start of the positive comma sequence or the start of the last five bits of the negative comma sequence.

With the 5-bit alignment determined, FIG. 8 depicts the further functioning of the data recovery system 24 of the high-speed transceiver 20 to achieve data alignment. As illustrated, the recovered 5-bit aligned comma portions are provided to the time ordered registers $T_0$, $T_{-1}$ and $T_{-2}$. Since it is unknown whether a negative comma sequence or positive comma sequence is being received, the bit pattern will either be 5-bits of don't care data (xxxxx) followed by the positive comma sequence or the negative comma sequence followed by 5-bits of data (ddddd) or don't care data. Each of the registers is shown to include the corresponding 5-bit portions for the negative comma sequence and the positive comma sequence.

The concatenator 70 concatenates the outputs of two of the three registers to produce the concatenated unique alignment sequence 62. For example, the concatenator 70 will concatenate registers $T_{-1}$ and $T_0$ to produce a first concatenated unique alignment sequence 62. Alternatively, the concatenator 70 will concatenate registers $T_{-2}$ and $T_{-1}$ to produce a second concatenated unique alignment sequence 62.

The comparison module 54 compares the concatenated unique alignment sequence 62 with the positive comma sequence and the negative comma sequence to determine whether the unique alignment sequence is the positive comma sequence or negative comma sequence. When the particular sequence is identified, the state machine 56 determines the particular word alignment 68, which is provided to a data alignment multiplexer 92. For example, when the first unique alignment sequence is favorable, the 10-bit boundary of the data words is stored in the $T_{-1}$ and $T_0$ registers such that when data is written into the buffer 90 via the data alignment multiplexer 92, the data from registers $T_{-1}$ and $T_0$ are written into as a complete data word. Conversely, when the second unique alignment sequence is favorable, the 10-bit boundary is established by the data in registers $T_{-2}$ and $T_{-1}$. Accordingly, when the data alignment multiplexer 92 writes data into buffer 90, it is done from registers $T_{-2}$ and $T_{-1}$ as a complete 10-bit data word.

Figure 9:
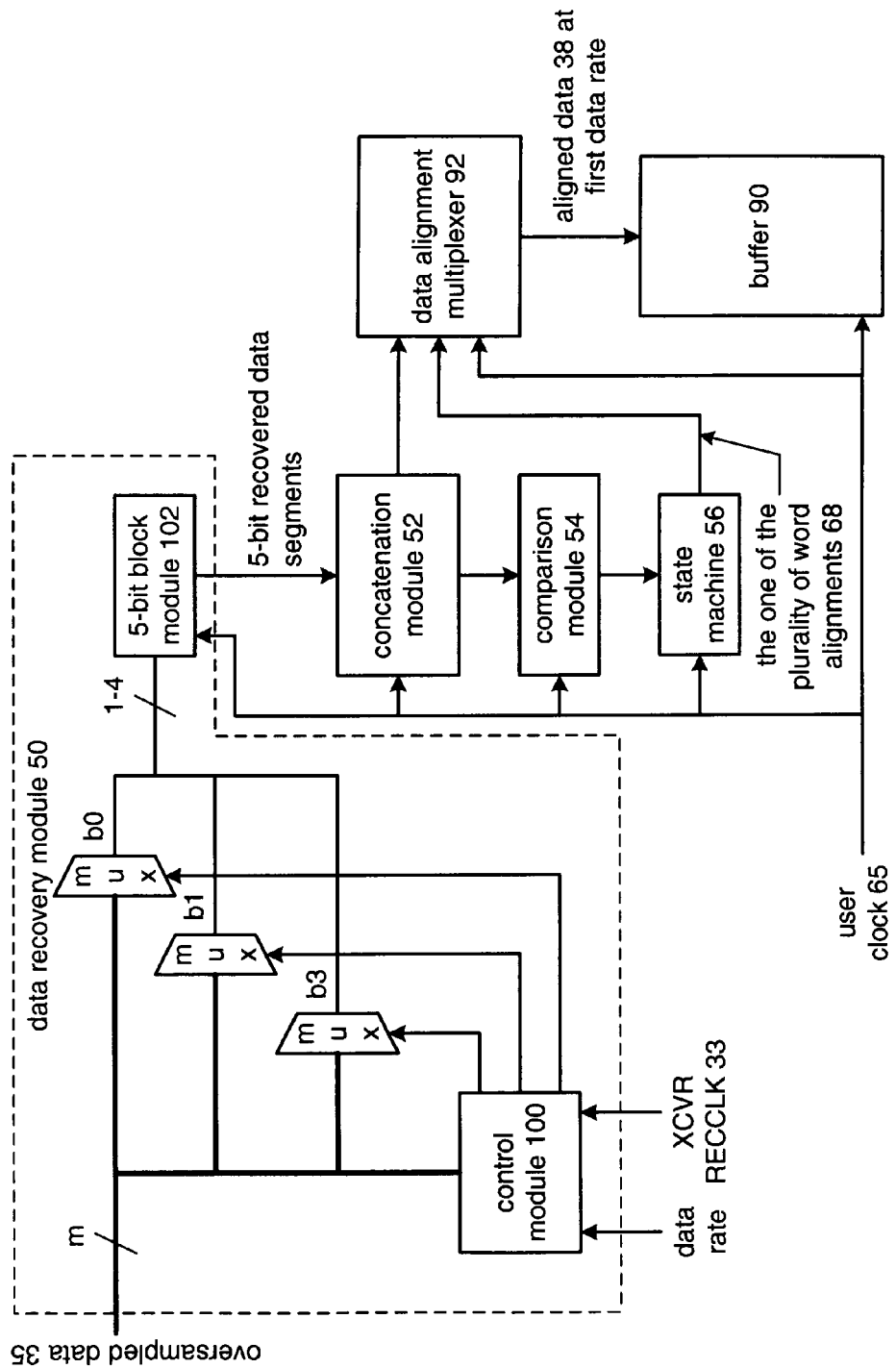
FIG. 9 is a schematic block diagram of another embodiment of a data recovery system in accordance with the present invention.

FIG. 9 is a schematic block diagram of an alternate embodiment of the data recovery system 24 that includes the data recovery module 50, the concatenation module 52, the comparison module 54, the state machine 56, the data alignment multiplexer 92, and buffer 90. The data recovery module 50 includes a control module 100, a plurality of multiplexers (MUX), and a 5-bit block module 102.

The data recovery module 50 allows for a range of low speed transmissions to be utilized within the transceiver. For example, assume the input of oversampled data is 20 bits, and oversample rate varies from 20X, 10X to 5X. Based on the oversample rate, the control module 100 may select 1, 2 or 4-bits of the oversampled data 35 to be provided to the 5-bit block module 102. The 5-bit block module 102 takes the 1, 2 or 4-bits of the oversampled data to produce 5-bit recovered data segments. The functionality of the concatenation module 52, comparison module 54, state machine 56, and data alignment multiplexer are as previously described.

Figure 10:
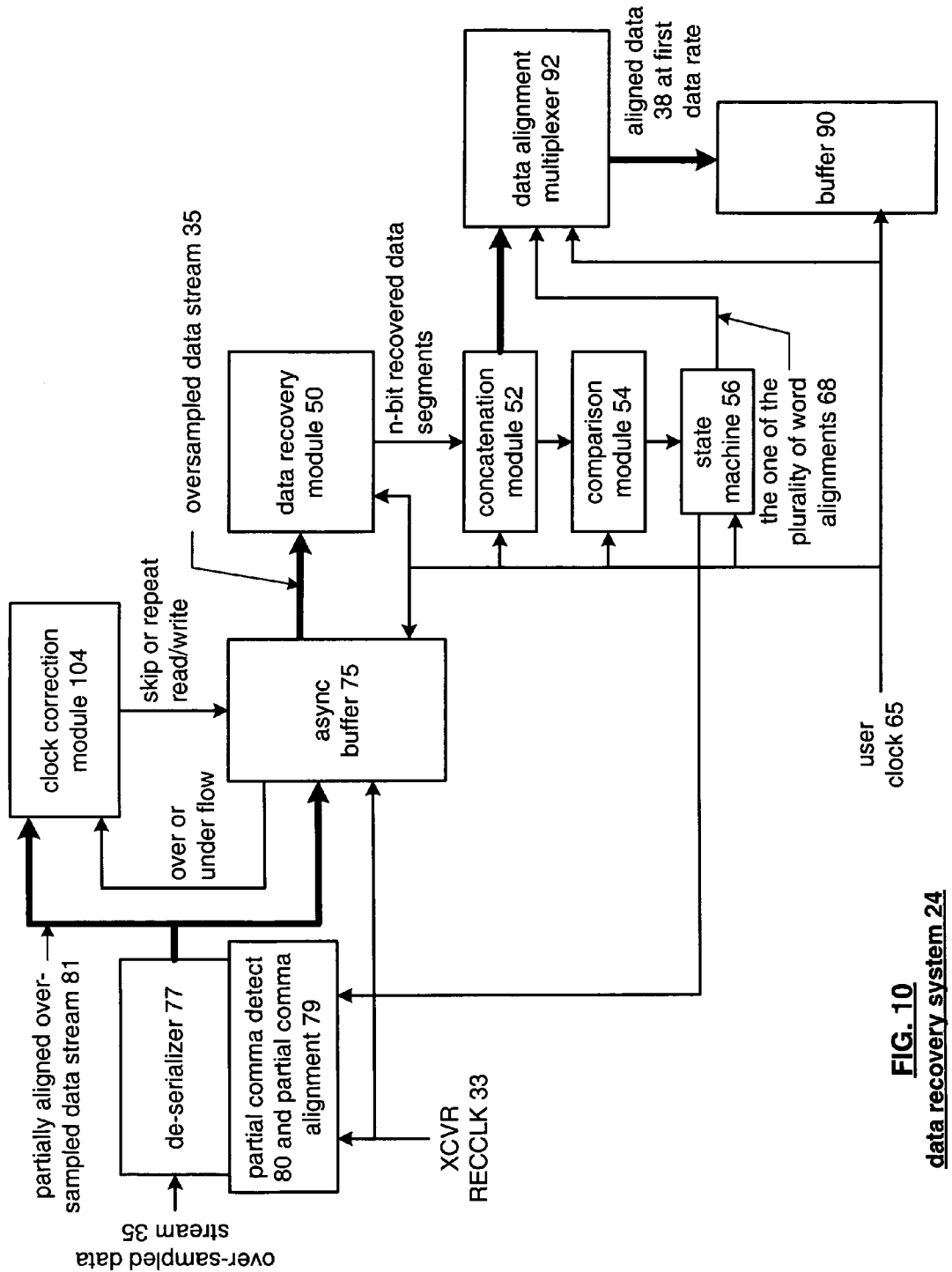
FIG. 10 is a schematic block diagram of yet another embodiment of a data recovery system in accordance with the present invention.

FIG. 10 is a schematic block diagram of another embodiment of the data recovery system 24 that includes a de-serializer 77, a partial comma detect 80 and alignment module 79, a clock correction module 104, an asynchronous buffer 75, the data recovery module 50, the concatenation module 52, the comparison module 54, the state machine 56, the data alignment multiplexer 92, and the buffer 90.

The de-serializer 77 receives the oversampled data 35 as a serial data stream that has not been aligned to any particular word boundary. The partial comma detect 80 and partial comma alignment module 79 work in conjunction with a de-serializer module 77 to convert the serial data of the oversampled data 35 to parallel data. The partial comma detect 80 and partial comma alignment module 79 detects any occurrence of partial comma in the oversampled data stream, by comparing an oversampled partial comma (e.g. 001->0000000011, 110->1111111100) with the oversampled data stream. Once partial comma is detected, the oversampled data is aligned to a word boundary defined by the location of the oversampled partial comma, thereby achieving partial alignment.

The de-serializer 77 outputs parallel data with its defined word boundary, which may be N-bits wide (e.g., N=20). The clock correction module 104 receives the partially aligned oversampled data and compares it with a defined oversampled clock correction sequence. The clock correction module works on partially aligned parallel data in conjunction with the asynchronous buffer 75, which only receives the partially aligned parallel data, to achieve clock correction.

The clock correction module 104, as will be described in greater detail with reference to FIGS. 11A-11C, will match the oversampled data stream 35 with the pre-defined oversampled clock correction sequence. Once it finds the oversampled clock correction sequence in the data stream, it can manipulate the asynchronous buffer 75 to resolve buffer overrun and or underrun.

Asynchronous buffer 75 is an asynchronous FIFO which balances different clock rates between its read and write ports. In FIG. 10, the write port (left side) of the buffer is clocked by the transceiver recovered clock, which corresponds to (but is not necessarily equal to) the data rate of the oversampled data stream. The read port (right side) of the buffer is clocked by the user clock, which corresponds to the data rate that user logic consumes data.

State machine 56 provides two control paths to the system. One goes to the data alignment multiplexer 92. The other goes to the partial comma detect 80 and partial comma alignment module 79. This allows for separate comma alignment into two steps: (1) partial comma alignment and (2) data alignment multiplexing.

Figure 11:
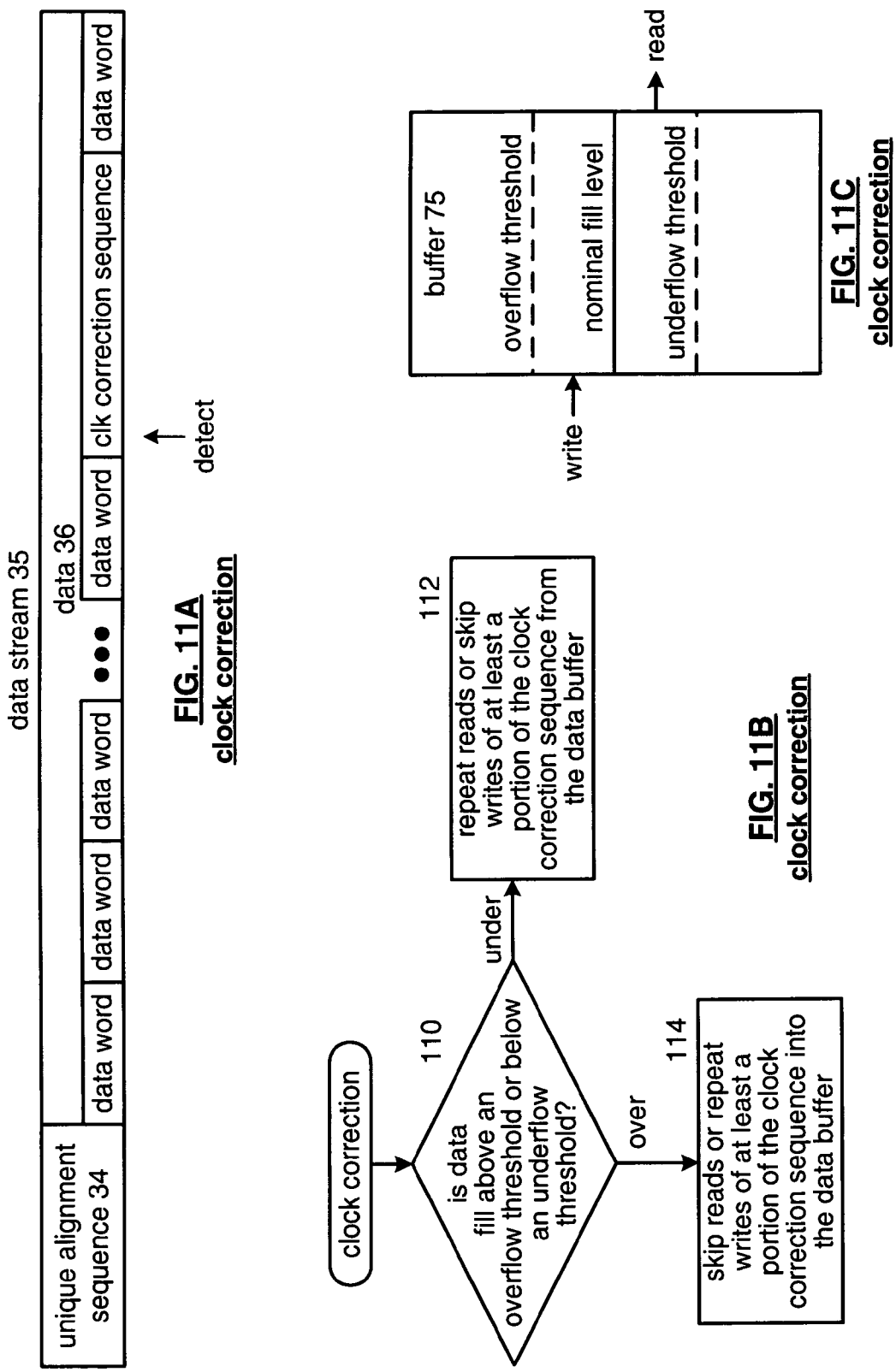
FIGS. 11A-11C illustrate an example of clock correction in accordance with the present invention.

FIG. 11A illustrates the oversampled data stream 35 that is being provided to the asynchronous buffer 75. As shown, the oversampled data portion 36 includes a plurality of oversampled data words and occasionally will include an oversampled clock correction sequence. The clock correction sequence is a unique pattern that does not correspond to a data pattern and may be equal to the unique alignment sequence. When the clock correction module 104 detects the presence of the oversampled clock correction sequence, it executes the method as illustrated in the logic diagram of FIG. 11B.

At Step 110, the clock correction module determines whether a data fill rate of the asynchronous buffer 75 is above an overflow threshold or below an underflow threshold. This can be further understood with reference to FIG. 11C. As shown in FIG. 11C, asynchronous buffer 75 may have a nominal fill level of approximately 50%. As such, the nominal fill level is maintained when the same amount of data is read from the buffer as written into the buffer. An overflow condition would arise when more data is written into the buffer than read from the buffer which occurs when the recovered clock rate is greater than the user clock rate of the receiving device. Conversely, when more data is read from the buffer than is written into the buffer, which corresponds to when the user clock rate is greater than the recovered clock rate, an underflow condition will result. Returning to the discussion of FIG. 11B, if neither an overflow or underflow condition threshold is exceeded, the clock correction sequence is stored in the buffer at the existing rate without alteration. If, however, the overflow threshold was exceeded, the process proceeds to Step 114 where reading of at least a portion of the clock correction sequence are skipped from the buffer. This enables the reading of the data from the buffer to catch-up to the writing of the data.

If, however, the underflow threshold was exceeded the process proceeds to Step 112. At Step 112, the reading of at least a portion of the clock correction sequence from the data buffer is repeated. This allows for the writing of the data to catch-up to the reading of the data. In alternative embodiments, the writing of data into the data buffer may be adjusted to compensate for an overflow or an underflow condition.

Figure 12:
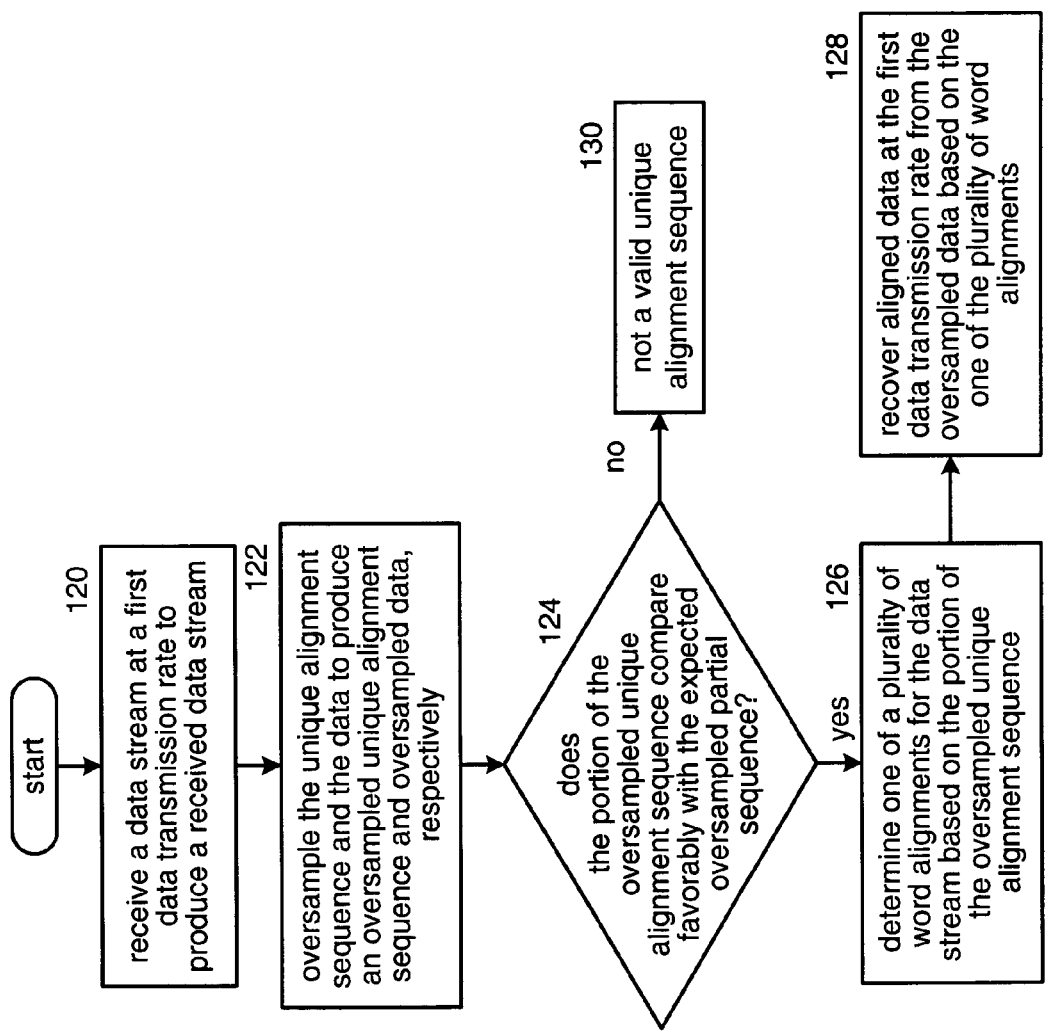
FIG. 12 is a logic diagram of a method for using a high-speed transceiver to receive lower data rate transmissions in accordance with the present invention.

FIG. 12 is a logic diagram of a method for using a high-speed transceiver to receive lower data rate transmissions. The process begins at Step 120 where the transceiver receives a data stream at a 1$^{st}$ data transmission rate to produce a received data stream. The data stream includes a unique alignment sequence and data. The 1$^{st}$ data transmission rate is at a rate that is less than the serial bit rate of the high-speed transceiver. In other words, the 1$^{st}$ data transmission rate is below the serial bit range of the transceiver. For example, the serial bit stream range of the transceiver may be from 600 Mbps to 3.125 Gbps while the 1st data transmission rate may be 133 Mbps, 266 Mbps, 531 Mbps, 270 Mbps, or 200 Mbps.

The process then proceeds to Step 122 where the transceiver oversamples the unique alignment sequence and the data to produce an oversampled unique alignment sequence and oversampled data, respectively. The oversampling rate will depend on the differences between the serial bit rate of the transceiver and the 1$^{st}$ data rate of the data stream.

The process then proceeds to Step 124 where a determination is made as to whether the portion of the oversampled unique alignment sequence compares favorably with an expected oversampled partial sequence. If not, the process proceeds to Step 130 where the transceiver indicates that the unique alignment sequence is not valid.

If, however, the comparison at Step 124 was favorable the process proceeds to Step 126. At Step 126, the transceiver determines one of the plurality of word alignments for the data stream based on the portion of the oversampled unique alignment sequence. The process then proceeds to Step 128 where the aligned data at the 1$^{st}$ data transmission rate is recovered from the oversampled data based on the one of the plurality of word alignments.

As one of average skill in the art will appreciate, the term "substantially" or "approximately", as may be used herein, provides an industry-accepted tolerance to its corresponding term. Such an industry-accepted tolerance may range, for example, from less than one percent to twenty percent and may correspond to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for a high-speed transceiver to receive lower data rate transmissions without the need for substantial external circuitry. As one of average skill in the art will appreciate, other embodiments may be derived from the teaching of the present invention without deviating from the scope of the claims.

I claim:

1. A method for using a high speed transceiver to receive lower data rate transmissions, the method comprises:
   receiving a data stream at a first data transmission rate, wherein the data stream includes a unique alignment sequence and data, and wherein the first data transmission rate is less than a serial bit rate of the high speed transceiver;
   oversampling the unique alignment sequence and the data to produce an oversampled unique alignment sequence and oversampled data, respectively;
   comparing a portion of the oversampled unique alignment sequence with an expected oversampled partial alignment sequence;
   when the comparing the portion of the oversampled unique alignment sequence with the expected oversampled partial alignment sequence is favorable, determining one of a plurality of word alignments for the data stream based on the portion of the oversampled unique alignment sequence;
   recovering aligned data at the first data transmission rate from the oversampled data based on the one of the plurality of word alignments;
   monitoring the oversampled data for at least a partial clock correction sequence;
   when the at least a partial clock correction sequence is detected, determining whether clock correction of the oversampled data is required; and
   when the clock correction is required, adjusting at least one of reading and writing of the at least a partial clock correction sequence into an asynchronous buffer.

2. The method of claim 1 wherein:
the unique alignment sequence is one of a plurality of bit patterns, wherein each of the plurality of bit patterns includes a same bit pattern portion at a different bit location than other bit patterns of the plurality of bit patterns and wherein the same bit pattern portion corresponds to the portion of the oversampled unique alignment sequence; and
wherein the determining the one of the plurality of word alignments includes:
performing a data recover function on the oversampled unique alignment sequence to produce a recovered unique alignment sequence;
concatenating a first portion of the recovered unique alignment sequence with a second portion of the recovered unique alignment sequence to produce a concatenated unique alignment sequence;
comparing the concatenated unique alignment sequence with the plurality of bit patterns to identify the one of the plurality of bit patterns; and
determining the one of the plurality of word alignments based on the one of the plurality of bit patterns.

3. The method of claim 2, wherein the concatenating the first portion of the recovered unique alignment sequence with the second portion of the recovered unique alignment sequence and the comparing the concatenated unique alignment sequence with the plurality of bit patterns comprise:
receiving, in a time-sequential order, multiple portions of the recovered unique alignment sequence;
storing each of the multiple portions of the recovered unique alignment sequence in corresponding ones of a plurality of time ordered registers;
retrieving the first portion of the recovered unique alignment sequence from a $T_{-1}$ register of the plurality of time ordered registers;
retrieving the second portion of the recovered unique alignment sequence from a $T_0$ register of the plurality of time ordered registers;
comparing the concatenated unique alignment sequence of the first portion from the $T_{-1}$ register and of the second portion from the $T_0$ register with a first bit pattern of the plurality of bit patterns;
when the comparing of the concatenated unique alignment sequence of the first portion from the $T_{-1}$ register and of the second portion from the $T_0$ register with the first bit pattern is unfavorable, equating a second bit pattern of the plurality of bit patterns as the one of the plurality of bit patterns.

4. The method of claim 3 further comprises:
when the comparing of the concatenated unique alignment sequence of the first portion from the $T_{-1}$ register and of the second portion from the $T_0$ register with the first bit pattern is favorable, equating the first bit pattern of the plurality of bit patterns as the one of the plurality of bit patterns.

5. The method of claim 2, wherein the concatenating the first portion of the recovered unique alignment sequence with the second portion of the recovered unique alignment sequence and the comparing the concatenated unique alignment sequence with the plurality of bit patterns comprise:
receiving, in a time-sequential order, multiple portions of the recovered unique alignment sequence;
storing each of the multiple portions of the recovered unique alignment sequence in corresponding ones of a plurality of time ordered registers;
retrieving the first portion of the recovered unique alignment sequence from a $T_{-1}$ register of the plurality of time ordered registers;
retrieving the second portion of the recovered unique alignment sequence from a $T_0$ register of the plurality of time ordered registers;
comparing the concatenated unique alignment sequence of the first portion from the $T_{-1}$ register and of the second portion from the $T_0$ register with a first bit pattern of the plurality of bit patterns;
when the comparing of the concatenated unique alignment sequence of the first portion from the $T_{-1}$ register and of the second portion from the $T_0$ register with the first bit pattern is unfavorable, comparing the concatenated unique alignment sequence of the first portion from a $T_{-2}$ register and of the second portion from the $T_{-1}$ register with a second bit pattern of the plurality of bit patterns; and
when the comparing of the concatenated unique alignment sequence of the first portion from the $T_{-2}$ register and of the second portion from the $T_{-1}$ register with a second bit pattern of the plurality of bit patterns is favorable, equating a second bit pattern of the plurality of bit patterns as the one of the plurality of bit patterns.

6. The method of claim 2, wherein the concatenating the first portion of the recovered unique alignment sequence with the second portion of the recovered unique alignment sequence and the comparing the concatenated unique alignment sequence with the plurality of bit patterns comprise:
receiving, in a time-sequential order, multiple portions of the recovered unique alignment sequence;
storing each of the multiple portions of the recovered unique alignment sequence in corresponding ones of a plurality of time ordered registers;
retrieving the first portion of the recovered unique alignment sequence from a $T_{-2}$ register of the plurality of time ordered registers;
retrieving the second portion of the recovered unique alignment sequence from a $T_{-1}$ register of the plurality of time ordered registers;
comparing the concatenated unique alignment sequence of the first portion from the $T_{-2}$ register and of the second portion from the $T_{-1}$ register with a second bit pattern of the plurality of bit patterns;
when the comparing of the concatenated unique alignment sequence of the first portion from the $T_{-2}$ register and of the second portion from the $T_{-1}$ register with the first bit pattern is unfavorable, equating a first bit pattern of the plurality of bit patterns as the one of the plurality of bit patterns.

7. The method of claim 6 further comprises:
when the comparing of the concatenated unique alignment sequence of the first portion from the $T_{-2}$ register and of the second portion from the $T_{-1}$ register with the first bit pattern is favorable, equating the second bit pattern of the plurality of bit patterns as the one of the plurality of bit patterns.

8. The method of claim 1, wherein the determining whether the clock correction of the oversampled data is required comprises:
determining whether data fill of the asynchronous buffer exceeds an overflow threshold or is below an underflow threshold; and
when the data fill of the data buffer exceeds an overflow threshold or is below an underflow threshold, determining that the clock correction is required.

9. The method of claim 1, wherein the adjusting at least one of reading and writing of the at least a partial clock correction sequence into an asynchronous buffer comprises:
- when the clock correction is required due to the data fill of the asynchronous buffer exceeding the overflow threshold, skipping reads or repeating writes of the at least a partial clock correction sequence into the asynchronous buffer; and
- when clock correction is required due to the data fill of the asynchronous buffer being below the underflow threshold, repeating reads or skipping writes of the at least a partial clock correction sequence in to the asynchronous buffer.

10. The method of claim 1 wherein the unique alignment sequence is one of a K28.5 (+) comma sequence and a K28.5 (−) comma sequence to allow for complimentary disparity, and wherein the data stream corresponds to 8B/10B encoded data, the method further comprises:
- comparing a 10-bit portion of the oversampled unique alignment sequence with an expected 10-bit oversampled partial sequence via a unique alignment sequence comparison module of the high speed transceiver;
- when the comparing the 10-bit portion of the oversampled unique alignment sequence with the expected 10-bit oversampled partial sequence is favorable, aligning the oversampled data with the oversampled partial sequence;
- when the oversampled data is aligned with the oversampled partial sequence, determining whether the oversampled unique alignment sequence corresponds to the K28.5 (+) comma sequence or to the K28.5 (−) comma sequence;
- when the oversampled unique alignment sequence corresponds to the K28.5 (+) comma sequence, aligning the recovering of the aligned data at the first data transmission rate from the oversampled data with the K28.5 (+) comma sequence; and
- when the oversampled unique alignment sequence corresponds to the K28.5 (−) comma sequence, aligning the recovering of the aligned data at the first data transmission rate from the oversampled data with the K28.5 (−) comma sequence.

11. The method of claim 10, wherein the determining whether the oversampled unique alignment sequence corresponds to a K28.5 (+) comma sequence or a K28.5 (−) comma sequence comprises:
- performing a data recover function on the oversampled unique alignment sequence to produce time-sequential ordered 5-bit portions of a recovered unique alignment sequence;
- storing each of the time-sequential ordered 5-bit portions of the recovered unique alignment sequence in corresponding ones of a plurality of time ordered registers;
- retrieving a first time-sequential ordered 5-bit portion from a $T_{-1}$ register of the plurality of time ordered registers;
- retrieving a second time-sequential ordered 5-bit portion from a $T_0$ register of the plurality of time ordered registers;
- concatenating the first and second time-sequential ordered 5-bit portions to produce a concatenated unique alignment sequence;
- comparing the concatenated unique alignment sequence with the K28.5 (+) comma sequence or the K28.5 (−) comma sequence;
- when the comparing of the concatenated unique alignment sequence with the K28.5 (+) comma sequence or the K28.5 (−) comma sequence is favorable, determining that the oversampled unique alignment sequence corresponds to the K28.5 (+) comma sequence or the K28.5 (−) comma sequence;
- when comparing of the concatenated unique alignment sequence with the K28.5 (+) comma sequence or the K28.5 (−) comma sequence is unfavorable, retrieving a third time-sequential ordered 5-bit portion from a $T_{-2}$ register of the plurality of time ordered registers;
- concatenating the third and the first time-sequential ordered 5-bit portions to produce a second concatenated unique alignment sequence;
- comparing the second concatenated unique alignment sequence with the K28.5 (+) comma sequence or the K28.5 (−) comma sequence; and
- when the comparing of the second concatenated unique alignment sequence with the K28.5 (+) comma sequence or the K28.5 (−) comma sequence is favorable, determining that the oversampled unique alignment sequence corresponds to the K28.5 (+) comma sequence or the K28.5 (−) comma sequence.

12. A high speed transceiver operable to receive lower data rate transmissions, the high speed transceiver comprises:
- oversampling module operably coupled to oversample a unique alignment sequence and data of a data stream received at a first data transmission to produce an oversampled unique alignment sequence and oversampled data, respectively, wherein the first data transmission rate is less than a serial bit rate of the high speed transceiver;
- a data recovery system operably coupled to:
  - compare a portion of the oversampled unique alignment sequence with an expected oversampled partial alignment sequence;
  - when the comparing the portion of the oversampled unique alignment sequence with the expected oversampled partial alignment sequence is favorable, determine one of a plurality of word alignments for the data stream based on the portion of the oversampled unique alignment sequence; and
  - recover aligned data at the first data transmission rate from the oversampled data based on the one of the plurality of word alignments;
- an asynchronous buffer for storing the oversampled data; and
- a clock correction module operably coupled to:
  - monitor the oversampled data for at least a partial clock correction sequence;
  - when the at least a partial clock correction sequence is detected, determine whether clock correction of the recovered aligned data is required; and
  - when the clock correction is required, adjust at least one of reading and writing of the at least a partial clock correction sequence into the asynchronous buffer.

13. The high speed transceiver of claim 12, wherein the data recovery system comprises:
- a data recovery module operably coupled to perform a data recover function on the oversampled unique alignment sequence to produce a recovered unique alignment sequence, wherein the unique alignment sequence is one of a plurality of bit patterns, wherein each of the plurality of bit patterns includes a same bit pattern portion at a different bit location than other bit patterns of the plurality of bit patterns and wherein the same bit pattern portion corresponds to the portion of the oversampled unique alignment sequence;

concatenation module operably coupled to concatenate a first portion of the recovered unique alignment sequence with a second portion of the recovered unique alignment sequence to produce a concatenated unique alignment sequence;

a comparison module operably coupled to compare the concatenated unique alignment sequence with the plurality of bit patterns to identify the one of the plurality of bit patterns; and state machine to determine the one of the plurality of word alignments based on the one of the plurality of bit patterns.

14. The high speed transceiver of claim 13 wherein the concatenation module includes a plurality of time ordered registers to store, in a time-sequential order, multiple portions of the recovered unique alignment sequence, further comprising a concatenator operably coupled to selectively:
retrieve the first portion of the recovered unique alignment sequence from a $T_{-1}$ register of the plurality of time ordered registers;
retrieve the second portion of the recovered unique alignment sequence from a $T_0$ register of the plurality of time ordered registers; and
concatenate the first portion of the recovered unique alignment sequence with the second portion of the recovered unique alignment sequence to produce the concatenated unique alignment sequence; and the state machine further functioning to, when the comparing of the concatenated unique alignment sequence of the first portion from the $T_{-1}$ register and of the second portion from the $T_0$ register with the first bit pattern is unfavorable, equate a second bit pattern of the plurality of bit patterns as the one of the plurality of bit patterns.

15. The high speed transceiver of claim 14 further comprises:

the state machine further functioning to, when the comparing of the concatenated unique alignment sequence of the first portion from the $T_{-1}$ register and of the second portion from the $T_0$ register with the first bit pattern is favorable, equate the first bit pattern of the plurality of bit patterns as the one of the plurality of bit patterns.

16. The high speed transceiver of claim 13 further comprises:

the concatenation module including a plurality of time ordered registers to store, in a time-sequential order, multiple portions of the recovered unique alignment sequence; and a concatenator operably coupled to selectively:
retrieve the first portion of the recovered unique alignment sequence from a $T_{-1}$ register of the plurality of time ordered registers;
retrieve the second portion of the recovered unique alignment sequence from a $T_0$ register of the plurality of time ordered registers; and
concatenate the first portion of the recovered unique alignment sequence with the second portion of the recovered unique alignment sequence to produce the concatenated unique alignment sequence;

the state machine furthering function to:
when the comparing of the concatenated unique alignment sequence of the first portion from the $T_{-1}$ register and of the second portion from the $T_0$ register with the first bit pattern is unfavorable, cause the concatenator to compare the concatenated unique alignment sequence of the first portion from a $T_{-2}$ register and of the second portion from the $T_{-1}$ register with a second bit pattern of the plurality of bit patterns; and when the comparison of the concatenated unique alignment sequence of the first portion from the $T_{-2}$ register and of the second portion from the $T_{-1}$ register with the second bit pattern of the plurality of bit patterns is favorable, equate a second bit pattern of the plurality of bit patterns as the one of the plurality of bit patterns.

17. The high speed transceiver of claim 13 further comprises:

the concatenation module including a plurality of time ordered registers to store, in a time-sequential order, multiple portions of the recovered unique alignment sequence; and a concatenator operably coupled to selectively:
retrieve the first portion of the recovered unique alignment sequence from a $T_{-2}$ register of the plurality of time ordered registers;
retrieve the second portion of the recovered unique alignment sequence from a $T_{-1}$ register of the plurality of time ordered registers;
concatenate the first portion of the recovered unique alignment sequence with the second portion of the recovered unique alignment sequence to produce the concatenated unique alignment sequence; and the state machine further functions to, when the comparing of the concatenated unique alignment sequence of the first portion from the $T_{-2}$ register and of the second portion from the $T_{-1}$ register with the first bit pattern is unfavorable, equate a first bit pattern of the plurality of bit patterns as the one of the plurality of bit patterns.

18. The high speed transceiver of claim 17 further comprises:

the state machine further functioning to, when the comparing of the concatenated unique alignment sequence of the first portion from the $T_{-2}$ register and of the second portion from the $T_{-1}$ register with the first bit pattern is favorable, equate the second bit pattern of the plurality of bit patterns as the one of the plurality of bit patterns.

19. The high speed transceiver of claim 12, wherein the clock correction module further functions to determine whether the clock correction of the oversampled data is required by:

determining whether data fill of the asynchronous buffer exceeds an overflow threshold or is below an underflow threshold; and when the data fill of the asynchronous buffer exceeds an overflow threshold or is below an underflow threshold, determining that the clock correction is required.

20. The high speed transceiver of claim 12, wherein the clock correction module further functions to adjust the at least one of reading and writing of the at least a partial clock correction sequence into the asynchronous buffer by:

when the clock correction is required due to the data fill of the asynchronous buffer exceeding the overflow threshold, skipping reads or repeating writes of the at least a partial clock correction sequence into the asynchronous buffer; and when clock correction is required to the data fill of the asynchronous buffer being below the underflow threshold, repeating reads or skipping writes of the at least a partial clock correction sequence into the asynchronous buffer.

21. The high speed transceiver of claim 12, wherein the unique alignment sequence is one of a K28.5 (+) comma sequence and a K28.5 (−) comma sequence to allow for complimentary disparity and wherein the data stream corresponds to 8B/10B encoded data, the high speed transceiver further comprises:

the data recovery system includes:

a unique alignment sequence comparison module operably coupled to compare a 10-bit portion of the oversampled unique alignment sequence with an expected 10-bit oversampled partial sequence via of the high speed transceiver, wherein the data recovery system further functions to:

when the comparing the 10-bit portion of the oversampled unique alignment sequence with the expected 10-bit oversampled partial sequence is favorable, determine whether the oversampled unique alignment sequence corresponds to a K28.5 (+) comma sequence or a K28.5 (−) comma sequence;

when the oversampled unique alignment sequence corresponds to the K28.5 (+) comma sequence, align the recovering of the aligned data at the first data transmission rate from the oversampled data with the K28.5 (+) comma sequence; and when the oversampled unique alignment sequence corresponds to the K28.5 (−) comma sequence, align the recovering of the aligned data at the first data transmission rate from the oversampled data with the K28.5 (−) comma sequence.

22. The high speed transceiver of claim 21, wherein the data recovery system further functions to determine whether the oversampled unique alignment sequence corresponds to a K28.5 (+) comma sequence or a K28.5 (−) comma sequence by:

performing a data recover function on the oversampled unique alignment sequence to produce time-sequential ordered 5-bit portions of a recovered unique alignment sequence;

storing each of the time-sequential ordered 5-bit portions of the recovered unique alignment sequence in corresponding ones of a plurality of time ordered registers;

retrieving a first time-sequential ordered 5-bit portion from a $T_{-1}$ register of the plurality of time ordered registers;

retrieving a second time-sequential ordered 5-bit portion from a $T_0$ register of the plurality of time ordered registers;

concatenating the first and second time-sequential ordered 5-bit portions to produce a concatenated unique alignment sequence;

comparing the concatenated unique alignment sequence with the K28.5 (+) comma sequence or the K28.5 (−) comma sequence;

when the comparing of the concatenated unique alignment sequence with the K28.5 (+) comma sequence or the K28.5 (−) comma sequence is favorable, determining that the oversampled unique alignment sequence corresponds to the K28.5 (+) comma sequence or the K28.5 (−) comma sequence;

when comparing of the concatenated unique alignment sequence with the K28.5 (+) comma sequence or the K28.5 (−) comma sequence is unfavorable, retrieving a third time-sequential ordered 5-bit portion from a $T_{-2}$ register of the plurality of time ordered registers;

concatenating the third and the first time-sequential ordered 5-bit portions to produce a second concatenated unique alignment sequence;

comparing the second concatenated unique alignment sequence with the K28.5(+) comma sequence or the K28.5 (−) comma sequence; and when the comparing of the second concatenated unique alignment sequence with the K28.5(+) comma sequence or the K28.5 (−) comma sequence is favorable, determining that the oversampled unique alignment sequence corresponds to the K28.5(+) comma sequence or the K28.5 (−) comma sequence.

23. The high speed transceiver of claim 12, wherein the data recovery system further comprises:

a data recovery module operably coupled to recover aligned data at the first data transmission rate from the oversampled data based on the one of the plurality of word alignments, wherein the data recovery module includes:

a plurality of multiplexers operably coupled to the oversampled data and to output corresponding recovered aligned data, wherein each of the plurality of multiplexers outputs the corresponding recovered aligned data at one of a plurality of data rates, wherein the plurality of data rates includes the first data transmission rate; and a control module operably coupled to the plurality of multiplexers to select one of the plurality of multiplexers based on the first data transmission rate.

24. A high speed transceiver operable to receive lower data rate transmissions, the high speed transceiver comprises:

means for receiving a data stream at a first data transmission rate, wherein the data stream includes a unique alignment sequence and data, and wherein the first data transmission rate is less than a serial bit rate of the high speed transceiver;

means for oversampling the unique alignment sequence and the data to produce an oversampled unique alignment sequence and oversampled data, respectively;

means for comparing a portion of the oversampled unique alignment sequence with an expected oversampled partial alignment sequence;

means for determining one of a plurality of word alignments for the data stream based on the portion of the oversampled unique alignment sequence;

means for recovering aligned data at the first data transmission rate from the oversampled data based on the one of the plurality of word alignments;

means for producing a recovered unique alignment sequence, wherein the unique alignment sequence is one of a plurality of bit patterns, wherein each of the plurality of bit patterns includes a same bit pattern portion at a different bit location than other bit patterns of the plurality of bit patterns and wherein the same bit pattern portion corresponds to the portion of the oversampled unique alignment sequence;

means for concatenating a first portion of the recovered unique alignment sequence with a second portion of the recovered unique alignment sequence to produce a concatenated unique alignment sequence;

wherein the means for comparing a portion of the oversampled unique alignment sequence with an expected oversampled partial alignment sequence compares the concatenated unique alignment sequence with the plurality of bit Patterns to identify the one of the plurality of bit patterns; and means for determining the one of the plurality of word alignments based on the one of the plurality of bit patterns.

25. A method for using a high speed transceiver to receive lower data rate transmissions, the method comprises:

receiving a data stream at a first data transmission rate, wherein the data stream includes a unique alignment sequence and data, and wherein the first data transmission rate is less than a serial bit rate of the high speed transceiver;

oversampling the unique alignment sequence and the data to produce an oversampled unique alignment sequence and oversampled data, respectively;

comparing a portion of the oversampled unique alignment sequence with an expected oversampled partial alignment sequence;

when the comparing the portion of the oversampled unique alignment sequence with the expected oversampled partial alignment sequence is favorable, determining one of a plurality of word alignments for the data stream based on the portion of the oversampled unique alignment sequence;

recovering aligned data at the first data transmission rate from the oversampled data based on the one of the plurality of word alignments;

wherein the unique alignment sequence is one of a plurality of bit patterns, wherein each of the plurality of bit patterns includes a same bit pattern portion at a different bit location than other bit patterns of the plurality of bit patterns and wherein the same bit pattern portion corresponds to the portion of the oversampled unique alignment sequence; and wherein the determining the one of the plurality of word alignments includes:

performing a data recover function on the oversampled unique alignment sequence to produce a recovered unique alignment sequence;

concatenating a first portion of the recovered unique alignment sequence with a second portion of the recovered unique alignment sequence to produce a concatenated unique alignment sequence;

comparing the concatenated unique alignment sequence with the plurality of bit patterns to identify the one of the plurality of bit patterns; and determining the one of the plurality of word alignments based on the one of the plurality of bit patterns.

26. The method of claim 25, wherein the concatenating the first portion of the recovered unique alignment sequence with the second portion of the recovered unique alignment sequence and the comparing the concatenated unique alignment sequence with the plurality of bit patterns comprise:

receiving, in a time-sequential order, multiple portions of the recovered unique alignment sequence;

storing each of the multiple portions of the recovered unique alignment sequence in corresponding ones of a plurality of time ordered registers;

retrieving the first portion of the recovered unique alignment sequence from a $T_{-1}$ register of the plurality of time ordered registers;

retrieving the second portion of the recovered unique alignment sequence from a $T_0$ register of the plurality of time ordered registers;

comparing the concatenated unique alignment sequence of the first portion from the $T_{-1}$ register and of the second portion from the $T_0$ register with a first bit pattern of the plurality of bit patterns;

when the comparing of the concatenated unique alignment sequence of the first portion from the $T_{-1}$ register and of the second portion from the $T_0$ register with the first bit pattern is unfavorable, equating a second bit pattern of the plurality of bit patterns as the one of the plurality of bit patterns.

27. The method of claim 26 further comprises:

when the comparing of the concatenated unique alignment sequence of the first portion from the $T_{-1}$ register and of the second portion from the $T_0$ register with the first bit pattern is favorable, equating the first bit pattern of the plurality of bit patterns as the one of the plurality of bit patterns.

28. The method of claim 25, wherein the concatenating the first portion of the recovered unique alignment sequence with the second portion of the recovered unique alignment sequence and the comparing the concatenated unique alignment sequence with the plurality of bit patterns comprise:

receiving, in a time-sequential order, multiple portions of the recovered unique alignment sequence;

storing each of the multiple portions of the recovered unique alignment sequence in corresponding ones of a plurality of time ordered registers;

retrieving the first portion of the recovered unique alignment sequence from a $T_{-1}$ register of the plurality of time ordered registers;

retrieving the second portion of the recovered unique alignment sequence from a $T_0$ register of the plurality of time ordered registers;

comparing the concatenated unique alignment sequence of the first portion from the $T_{-1}$ register and of the second portion from the $T_0$ register with a first bit pattern of the plurality of bit patterns;

when the comparing of the concatenated unique alignment sequence of the first portion from the $T_{-1}$ register and of the second portion from the $T_0$ register with the first bit pattern is unfavorable, comparing the concatenated unique alignment sequence of the first portion from a $T_{-2}$ register and of the second portion from the $T_{-1}$ register with a second bit pattern of the plurality of bit patterns; and when the comparing of the concatenated unique alignment sequence of the first portion from the $T_{-2}$ register and of the second portion from the $T_{-1}$ register with a second bit pattern of the plurality of bit patterns is favorable, equating a second bit pattern of the plurality of bit patterns as the one of the plurality of bit patterns.

29. The method of claim 25, wherein the concatenating the first portion of the recovered unique alignment sequence with the second portion of the recovered unique alignment sequence and the comparing the concatenated unique alignment sequence with the plurality of bit patterns comprise:

receiving, in a time-sequential order, multiple portions of the recovered unique alignment sequence;

storing each of the multiple portions of the recovered unique alignment sequence in corresponding ones of a plurality of time ordered registers;

retrieving the first portion of the recovered unique alignment sequence from a $T_{-2}$ register of the plurality of time ordered registers;

retrieving the second portion of the recovered unique alignment sequence from a $T_{-1}$ register of the plurality of time ordered registers;

comparing the concatenated unique alignment sequence of the first portion from the $T_{-2}$ register and of the second portion from the $T_{-1}$ register with a second bit pattern of the plurality of bit patterns;

when the comparing of the concatenated unique alignment sequence of the first portion from the $T_{-2}$ register and of the second portion from the $T_{-1}$ register with the first bit pattern is unfavorable, equating a first bit pattern of the plurality of bit patterns as the one of the plurality of bit patterns.

30. The method of claim 29 further comprises:
when the comparing of the concatenated unique alignment sequence of the first portion from the $T_{-2}$ register and of the second portion from the $T_{-1}$ register with the first bit pattern is favorable, equating the second bit pattern of the plurality of bit patterns as the one of the plurality of bit patterns.

31. A high speed transceiver operable to receive lower data rate transmissions, the high speed transceiver comprises:
oversampling module operably coupled to oversample a unique alignment sequence and data of a data stream received at a first data transmission to produce an oversampled unique alignment sequence and oversampled data, respectively, wherein the first data transmission rate is less than a serial bit rate of the high speed transceiver;
a data recovery system operably coupled to:
compare a portion of the oversampled unique alignment sequence with an expected oversampled partial alignment sequence;
when the comparing the portion of the oversampled unique alignment sequence with the expected oversampled partial alignment sequence is favorable, determine one of a plurality of word alignments for the data stream based on the portion of the oversampled unique alignment sequence; and
recover aligned data at the first data transmission rate from the oversampled data based on the one of the plurality of word alignments,
wherein the data recovery system comprises:
a data recovery module operably coupled to perform a data recover function on the oversampled unique alignment sequence to produce a recovered unique alignment sequence, wherein the unique alignment sequence is one of a plurality of bit patterns, wherein each of the plurality of bit patterns includes a same bit pattern portion at a different bit location than other bit patterns of the plurality of bit patterns and wherein the same bit pattern portion corresponds to the portion of the oversampled unique alignment sequence;
concatenation module operably coupled to concatenate a first portion of the recovered unique alignment sequence with a second portion of the recovered unique alignment sequence to produce a concatenated unique alignment sequence;
a comparison module operably coupled to compare the concatenated unique alignment sequence with the plurality of bit patterns to identify the one of the plurality of bit patterns; and
state machine to determine the one of the plurality of word alignments based on the one of the plurality of bit patterns.

32. The high speed transceiver of claim 31 wherein the concatenation module includes a plurality of time ordered registers to store, in a time-sequential order, multiple portions of the recovered unique alignment sequence, further comprising
a concatenator operably coupled to selectively:
retrieve the first portion of the recovered unique alignment sequence from a $T_{-1}$ register of the plurality of time ordered registers;
retrieve the second portion of the recovered unique alignment sequence from a $T_0$ register of the plurality of time ordered registers; and
concatenate the first portion of the recovered unique alignment sequence with the second portion of the recovered unique alignment sequence to produce the concatenated unique alignment sequence; and
the state machine further functioning to, when the comparing of the concatenated unique alignment sequence of the first portion from the $T_{-1}$ register and of the second portion from the $T_0$ register with the first bit pattern is unfavorable, equate a second bit pattern of the plurality of bit patterns as the one of the plurality of bit patterns.

33. The high speed transceiver of claim 32 further comprises:
the state machine further functioning to, when the comparing of the concatenated unique alignment sequence of the first portion from the $T_{-1}$ register and of the second portion from the $T_0$ register with the first bit pattern is favorable, equate the first bit pattern of the plurality of bit patterns as the one of the plurality of bit patterns.

34. The high speed transceiver of claim 31 further comprises:
the concatenation module including a plurality of time ordered registers to store, in a time-sequential order, multiple portions of the recovered unique alignment sequence; and
a concatenator operably coupled to selectively:
retrieve the first portion of the recovered unique alignment sequence from a $T_{-1}$ register of the plurality of time ordered registers;
retrieve the second portion of the recovered unique alignment sequence from a $T_0$ register of the plurality of time ordered registers; and
concatenate the first portion of the recovered unique alignment sequence with the second portion of the recovered unique alignment sequence to produce the concatenated unique alignment sequence;
the state machine furthering function to,
when the comparing of the concatenated unique alignment sequence of the first portion from the $T_{-1}$ register and of the second portion from the $T_0$ register with the first bit pattern is unfavorable, cause the concatenator to compare the concatenated unique alignment sequence of the first portion from a $T_{-2}$ register and of the second portion from the $T_{-1}$ register with a second bit pattern of the plurality of bit patterns; and
when the comparison of the concatenated unique alignment sequence of the first portion from the $T_{-2}$ register and of the second portion from the $T_{-1}$ register with the second bit pattern of the plurality of bit patterns is favorable, equate a second bit pattern of the plurality of bit patterns as the one of the plurality of bit patterns.

35. The high speed transceiver of claim 31 further comprises:
the concatenation module including a plurality of time ordered registers to store, in a time-sequential order, multiple portions of the recovered unique alignment sequence; and
a concatenator operably coupled to selectively:
retrieve the first portion of the recovered unique alignment sequence from a $T_{-2}$ register of the plurality of time ordered registers;
retrieve the second portion of the recovered unique alignment sequence from a $T_{-1}$ register of the plurality of time ordered registers;
concatenate the first portion of the recovered unique alignment sequence with the second portion of the recovered unique alignment sequence to produce the concatenated unique alignment sequence; and the state machine further functions to, when the comparing of the concatenated unique alignment sequence of the first portion from the $T_{-2}$ register and of the second portion from the $T_{-1}$ register with the first bit pattern is unfavorable, equate a first bit pattern of the plurality of bit patterns as the one of the plurality of bit patterns.

36. The high speed transceiver of claim 35 further comprises:

the state machine further functioning to, when the comparing of the concatenated unique alignment sequence of the first portion from the $T_{-2}$ register and of the second portion from the $T_{-1}$ register with the first bit pattern is favorable, equate the second bit pattern of the plurality of bit patterns as the one of the plurality of bit patterns.

37. A high speed transceiver operable to receive lower data rate transmissions, the high speed transceiver comprises:

oversampling module operably coupled to oversample a unique alignment sequence and data of a data stream received at a first data transmission to produce an oversampled unique alignment sequence and oversampled data, respectively, wherein the first data transmission rate is less than a serial bit rate of the high speed transceiver;

a data recovery system operably coupled to:

compare a portion of the oversampled unique alignment sequence with an expected oversampled partial alignment sequence;

when the comparing the portion of the oversampled unique alignment sequence with the expected oversampled partial alignment sequence is favorable, determine one of a plurality of word alignments for the data stream based on the portion of the oversampled unique alignment sequence; and recover aligned data at the first data transmission rate from the oversampled data based on the one of the plurality of word alignments;

wherein the data recovery system further comprises:

a data recovery module operably coupled to recover aligned data at the first data transmission rate from the oversampled data based on the one of the plurality of word alignments, wherein the data recovery module includes:

a plurality of multiplexers operably coupled to the oversampled data and to output corresponding recovered aligned data, wherein each of the plurality of multiplexers outputs the corresponding recovered aligned data at one of a plurality of data rates, wherein the plurality of data rates includes the first data transmission rate; and a control module operably coupled to the plurality of multiplexers to select one of the plurality of multiplexers based on the first data transmission rate.

* * * * *